(12) United States Patent
Hickson

(10) Patent No.: US 7,895,604 B2
(45) Date of Patent: Feb. 22, 2011

(54) METHOD AND DEVICE FOR EVENT COMMUNICATION BETWEEN DOCUMENTS

(75) Inventor: Ian Hickson, Oslo (NO)

(73) Assignee: Opera Software ASA, Oslo (NO)

( * ) Notice: Subject to any disclaimer, the term of this patent is extended or adjusted under 35 U.S.C. 154(b) by 1338 days.

(21) Appl. No.: 11/280,342

(22) Filed: Nov. 17, 2005
(Under 37 CFR 1.47)

(65) Prior Publication Data
US 2007/0113237 A1 May 17, 2007

(51) Int. Cl.
*G06F 9/44* (2006.01)

(52) U.S. Cl. .................. 719/317; 719/320; 709/202

(58) Field of Classification Search .................. 719/313, 719/315, 317, 318, 310, 320; 709/201, 202, 709/203, 217, 218, 219, 223, 224; 715/207, 715/234
See application file for complete search history.

(56) References Cited

U.S. PATENT DOCUMENTS

| | | | | |
|---|---|---|---|---|
| 6,260,059 B1* | 7/2001 | Ueno et al. | .................. | 709/202 |
| 6,549,221 B1* | 4/2003 | Brown et al. | ................. | 715/854 |
| 6,643,650 B1* | 11/2003 | Slaughter et al. | ............. | 707/10 |
| 6,725,424 B1* | 4/2004 | Schwerdtfeger et al. | .... | 715/239 |
| 6,829,746 B1* | 12/2004 | Schwerdtfeger et al. | .... | 715/239 |
| 6,944,665 B2* | 9/2005 | Brown et al. | ................. | 709/227 |
| 7,054,952 B1* | 5/2006 | Schwerdtfeger et al. | .... | 709/246 |
| 7,139,976 B2* | 11/2006 | Kausik et al. | ................ | 715/234 |
| 7,194,683 B2* | 3/2007 | Hind et al. | ................... | 715/235 |
| 7,461,134 B2* | 12/2008 | Ambrose | .................... | 709/217 |
| 7,506,248 B2* | 3/2009 | Xu et al. | ...................... | 715/240 |
| 2004/0003043 A1* | 1/2004 | Rajamony et al. | ........... | 709/205 |
| 2006/0075088 A1* | 4/2006 | Guo et al. | .................... | 709/224 |

OTHER PUBLICATIONS

W3C "Document Object Model (DOM) Level 1 Specification", Oct. 1, 1998. pp. 1-169.*
Web Applications 1.0 Working Draft—Sep. 23, 2004, Hickson, Ian; Oct. 9, 2004; downloaded from <http://web.archive.org/web/20041009144718/http://www.whatwg.org/specs/web-apps/current-work/>.

* cited by examiner

*Primary Examiner*—Van H Nguyen
(74) *Attorney, Agent, or Firm*—Birch, Stewart, Kolasch and Birch, LLP

(57) ABSTRACT

A method for sending data from a first to a second document when both documents are loaded by a user agent implemented on a client device. The method may comprise the execution of a script in the first document, said script providing the data to be sent to the second document. The user agent may be configured to retrieve information uniquely identifying the first document as well as an origin of the first document. This information may have been collected by the user agent when the document was first loaded, and may not be influenced by the script. The user agent may then send a message to the second document containing the data provided by the script in the first document and the identification of the first document.

20 Claims, 4 Drawing Sheets

METHOD AND DEVICE FOR EVENT COMMUNICATION BETWEEN DOCUMENTS

BACKGROUND OF THE INVENTION

1. Field of the Invention

The present invention relates to a method and a device for exchange of information between documents loaded by a user agent such as a web browser. In particular, the present invention relates to exchange of event related data between documents when such exchange is otherwise precluded by security policies.

2. Description of Background Art

In order to provide more dynamic content to applications that access content from a network such as the Internet, a number of improvements and extensions to the various protocols and standards used have been introduced over the years. Some of these standards include Cascading Style Sheets (CSS), Document Object Model (DOM), various extensions and alternatives to the Hypertext Markup Language (HTML), including Dynamic HTML, Extensible HTML (XHTML), and various programming and scripting languages such as Java, PHP, JavaScript, ECMAscript etc. (Java and JavaScript are trademarks of Sun Microsystems, Inc.)

The World Wide Web Consortium (W3C) defines DOM as a platform- and language-neutral interface that will allow programs and scripts to dynamically access and update the content, structure and style of documents. The document can be further processed and the results of that processing can be incorporated back into the presented page.

ECMAscript is a standard for scripting languages, more commonly known as JavaScript. A client side script is code embedded in or imported into a document in order to be executed on the client computer on which the document is displayed. It is different from server side scripts, which execute on the server and embed the results in a document before the document is transmitted. A typical example of a server side scripting language is PHP, but even JavaScript can be used to create server side scripts.

For simplicity the term script will be used hereinbelow to refer to any executable script or program code that is embedded in or imported into a document in order to be executed on the client computer or device, regardless of the actual scripting language used.

As already mentioned, DOM defines interfaces allowing scripts and programs to access and update documents. However, for security reasons there are strict limits imposed on how and which data a script is allowed to access or exchange with another script. A script runs within the scope and context of a specific document with which it is associated, and has access to this document using standard methods. In this sense the document and the script may be understood as a single unit.

That is not to say that a script cannot be reused. Scripts can for example be stored in separate files locally or on a server and imported into documents, but the instance of the script that is so imported becomes part of the document, and has a separate identity from any other instance of the same script even if originating from the same file and from the same domain.

According to DOM, (X)HTML and XML structures are organized into a hierarchical model. This model is made up of DOM nodes that can be addressed using standardized DOM interfaces. The nodes themselves are data objects, and they are related to each other in a well organized tree of nodes where the root node represents the document itself.

Access to nodes, including nodes belonging to different documents, may take place using so called events. An event is a software message that indicates that something specific has happened. The message is "fired" or "posted" by a function that detects the occurrence or fulfillment of certain conditions and the target for the message is a DOM node. Event-driven languages, such as JavaScript and ECMAscript, register various functions on the referenced node (i.e. the receiving node). These functions may be referred to as event handlers or event listeners and they are designed to receive the posted event, process and/or act upon it, and output a result.

Hereinbelow, unless otherwise specified, the word event may be used to cover the condition or occurrence that triggers the posting of the event message, or the event message itself. This will allow for simpler language. Following this terminology it will be possible to say that when an event occurs in one node, it may be received by an event handler in another node. This involves an abstraction that hides the fact that the event that occurs may be very different from the data received by the event handler, but this will be readily understood by a person skilled in the art.

As mentioned above, a script is associated with a document and has access to this document using standardized methods, but data exchange outside the scope of the document is severely restricted. According to the JavaScript security model, the requirement for Cross Domain Event Communication to take place is that the documents are able to refer to each others DOM Document object nodes using DOM interfaces ("DOM Document reference"). However, they cannot necessarily access the content of the DOM Document object.

Such a reference can for instance be created when one document creates a HTML OBJECT element and directs a user agent (e.g. a browser) into which it is loaded, to load a different document into the OBJECT. In this case the parent DOM document can refer to the DOM document within the OBJECT tags, the child document, using standardized methods. The child document can also refer to the parent DOM document using standardized methods.

One limitation imposed by the JavaScript security model, which is a typical security policy in a browser environment, is that scripts running in two documents from different origins may not interact. When a document is loaded from one origin and a script is running within a document loaded from a different origin, the script cannot get or set any properties of certain objects in the first document. The origin is defined by the user agent as the substring of a URI that includes protocol://host, where host also includes the optional :port part of the string. Table 1 shows some examples of comparisons with the URI http://company.com/dir/page.html.

TABLE 1

| URL | Outcome | Reason |
| --- | --- | --- |
| http://company.com/dir2/other.html | Success | Same domain, different directory |
| http://company.com/dir/inner/another.html | Success | Same domain, different subdirectory |
| http://www.company.com/dir/other.html | Failure | Different domains |
| file://D|/myPage.htm | Failure | Different protocols |
| http://company.com:8080/dir/etc.html | Failure | Different port |

There is one exception to the same origin rule. A script can set the value of document.domain to a suffix of the current domain. In this case the shorter domain is used for subsequent origin checks. For example, a script in the document at http://www.company.com/dir/other.html could execute the following statement:

document.domain="company.com";

After execution of that statement, the page would pass the origin check with http://company.com/dir/page.html.

The same origin requirement reduces flexibility and functionality for developers of applications and of content, particularly for highly mobile environments where functionality and content from a number of different providers should be integrated and able to interoperate. As an example, on mobile devices such as mobile telephones and PDAs user applications, interfaces and content may be a result of a combination of features and data delivered from the manufacturer of the device, a network operator, software providers and content providers.

With the restrictions imposed by the DOM interfaces and script security policies the necessary flexibility is difficult to achieve.

SUMMARY OF THE INVENTION

The present invention provides a method for sending data from a first to a second document when both documents are loaded by a user agent implemented on a client device. The method may comprise the execution of a script in the first document, said script providing the data to be sent to the second document. According to principles consistent with the present invention, the user agent may then be configured to retrieve information uniquely identifying the first document as well as an origin of the first document. This information may have been collected by the user agent when the document was first loaded, e.g. in accordance with implementation of the various protocols implemented by the user agent, such as HTTP, FTP, UDP etc., and may not be influenced by the script itself. The user agent may then send a message to the second document containing the data provided by the script in the first document and the identification of the first document.

The message may then be received by an event listener defined in said second document and processing by a script in said second document.

The information identifying the origin of the first document may include information representing a domain from which said first document has been retrieved. It may also include information representing a URI for the first document.

According to principles consistent with the invention, a method implemented in the user agent may be invoked by the script in the first document. This method may be defined to receive the data to be exchanged, receive information identifying the second document, extract information identifying the origin of the first document, and passing said information to be exchanged and said information identifying said origin to the second document.

According to one aspect of the invention, the structure of said documents are addressed according to one or more application programming interfaces (APIs) defined in said user agent. According to further aspects of the invention, these APIs may defined in a Document Object Model (DOM) module that is part of said user agent. In accordance with these aspects, it would be consistent with principles of the invention to let the unique identification of the second document be a reference to a DOM document object representing the second document, and letting the method be called as a method belonging to the second document or the representation of the second document. Similarly, the information representing a unique identification of the first document may be a reference to a DOM object representing a local instantiation of the first document.

According to one aspect of the present invention, when the documents and the structure of the documents are addressed according to application programming interfaces (APIs) defined in a Document Object Model (DOM) module that is part of the user agent, the method invoked by the script in the first document may belong to a DOM document type object, and the user agent may be configured to instantiate, upon loading the first and the second document, two objects representing the documents.

According to another aspect of the invention, when the documents and the structure of said documents are addressed according to application programming interfaces (APIs) defined in a Document Object Model (DOM) module that is part of said user agent, the method invoked by the script in the first document may belong to a DOM window type object.

According to a further aspect of the invention, scripts included in the first and the second document may be ECMAScript (JavaScript) or substantially ECMAScript compatible.

The present invention also provides a computer device with a display, configured to load and display documents, and comprising computer program code that enables the device to perform various aspects of the method just described.

The present invention also provides a computer program product containing a set of instructions, which may be executed by one or more computer processors in order to perform various aspects of the method described above. Such a computer program product may be carried on a computer readable medium such as a magnetic storage device, an optical storage device and a flash memory, or it may be carried on a propagated signal.

For a full understanding of the scope of the present invention, reference is made to the appended claims.

BRIEF DESCRIPTION OF THE DRAWINGS

Exemplary embodiments of the present invention will become more fully understood from the detailed description given hereinbelow and the accompanying drawings. These drawings are given by way of illustration only and, thus, are not limiting on the present invention. In the drawings, like reference numbers represent like elements, wherein.

DETAILED DESCRIPTION OF EXEMPLARY EMBODIMENTS

The present invention is directed at a method for exchanging information between computer programs and/or objects running on a device and within a context that restricts exchange of information between such programs. To facilitate understanding of the invention the description will primarily focus on aspects and embodiments presented as nonlimiting examples related to well-known standards and protocols for data processing, primarily within the context of the Internet.

Object oriented programming is a programming paradigm that is well known to those skilled in the art of computer science and technology. The exemplary embodiments and aspects described herein, will be based on terminology from object oriented programming where such terms as objects, classes, functions, methods and interfaces are well known. Even though these terms are intended to be understood substantially as they are used within that field, the invention itself is not limited to object oriented realizations.

The Document Object Model (DOM) is a standard that can be used to describe the hierarchical relationship between elements of structured documents, such as markup language documents (HTML, DHTML, XML, SVG etc.), in an object-oriented manner. DOM also provides a set of interfaces and methods for accessing various elements of the documents. Computer programs can take advantage of DOM in order to access information from documents or send information to documents. However, the security policies associated with many types of programs, for example scripts written in ECMAScript, restrict the way information can be exchanged between documents.

DOM is typically implemented in a user agent, such as a browser, running on a device, where it provides application programming interfaces (APIs) and a library of objects, functions and methods for the ECMAScript engine of the user agent. Hereinafter DOM implementation will be used to refer to the implementation of DOM in the user agent.

Figure 1:
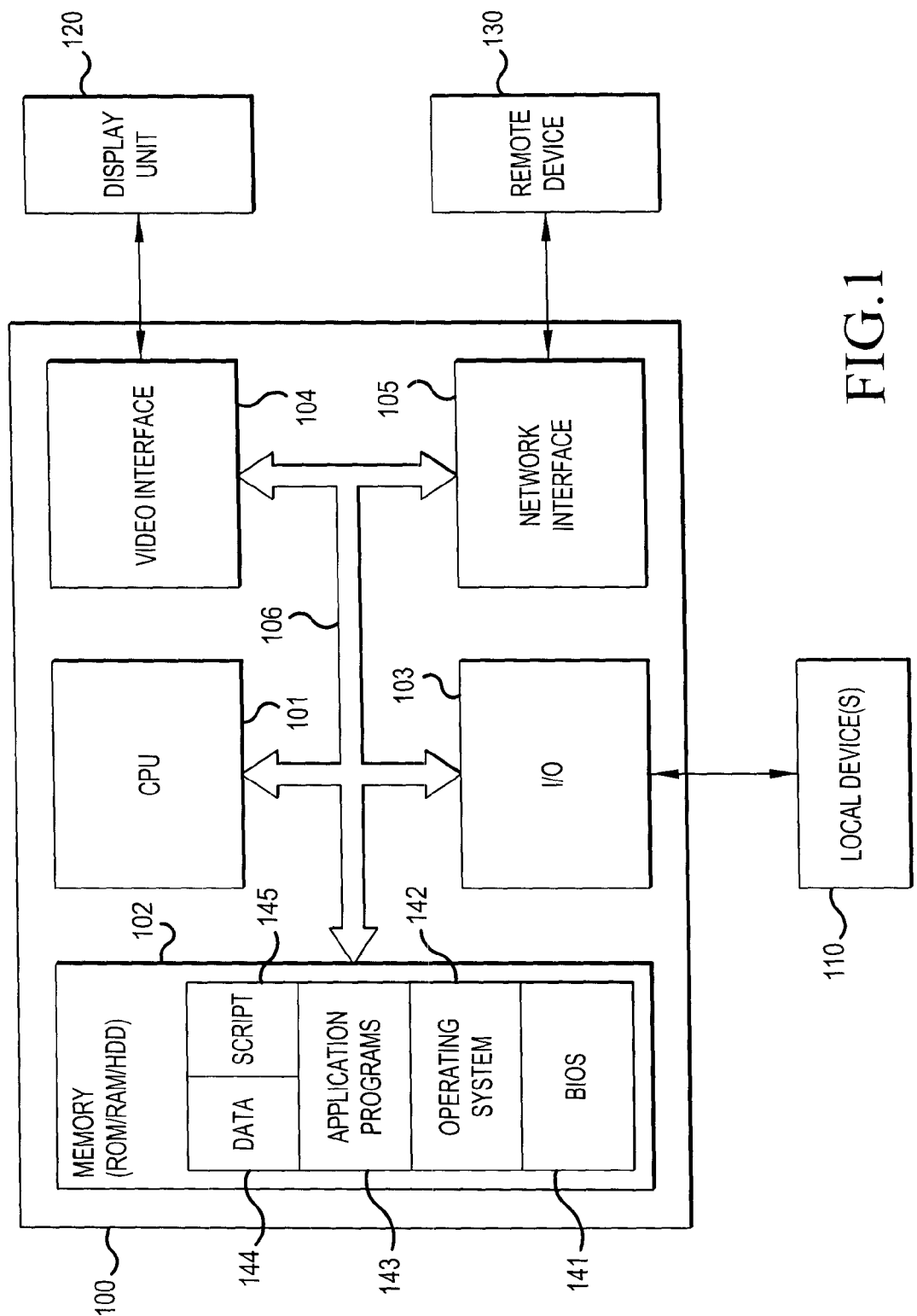
FIG. 1 shows a diagram of a computing device that can be used for implementing various aspects of the present invention.

FIG. 1 illustrates a generalized computing device 100 that can be used as an environment for implementing various aspects of the present invention. In FIG. 1, a device 100 includes a central processor unit (CPU) 101, memory 102, communication port(s) or input/output ports (hereinafter referred to as I/O) 103, a video interface 104, and a network interface 105. These units are in communication with each other by way of a system bus 106.

The memory, which may include ROM, RAM, flash memory, hard drives, or any other combination of fixed and removable memory, stores the various software components of the system, such as a basic input/output system (BIOS) 141, an operating system 142, various computer programs 143 including applications and device drivers, various types of data 144, and other executable files or instructions such as macros and scripts 145.

The I/O ports 103 may be connected to one or more local devices 110 such as user input devices, a printer, a media player, external memory devices, and special purpose devices such as e.g. a global positioning system receiver (GPS). The I/O ports 103 may be any combination of such ports as USB, PS/2, RS-232, infra red (IR), Bluetooth, printer ports, or any other standardized or dedicated communication interface for local devices.

The video interface device 104 is connected to a display unit 120 which may be an external monitor or an integrated display such as a LCD display. The display unit 120 may have a touch sensitive screen and in that case the display unit doubles as a user input device. The user input device aspects of the display unit may be considered as one of the local devices 110 communicating over a communication port 103.

The network interface device 105 provides the device 100 with the ability to connect to a network in order to communicate with a remote device 130. The communication network, which in FIG. 1 is only illustrated as the line connecting the network interface 105 with the remote device 130, may e.g. be a local area network or the Internet. The remote device may in principle be any computing device with similar communications capabilities as the device 100, but may typically be a server or some other unit providing a networked service.

It will be understood that the device 100 illustrated in FIG. 1 is not limited to any particular configuration or embodiment regarding size or resources. The various components illustrated may be implemented as one or more integrated units of the device 100 or distributed over several units. Other units or capabilities may of course also be present. Furthermore, the device 100 may e.g. be a general purpose computer such as a PC, or a personal digital assistant (PDA), or even a cellphone or a smartphone.

Figure 2:
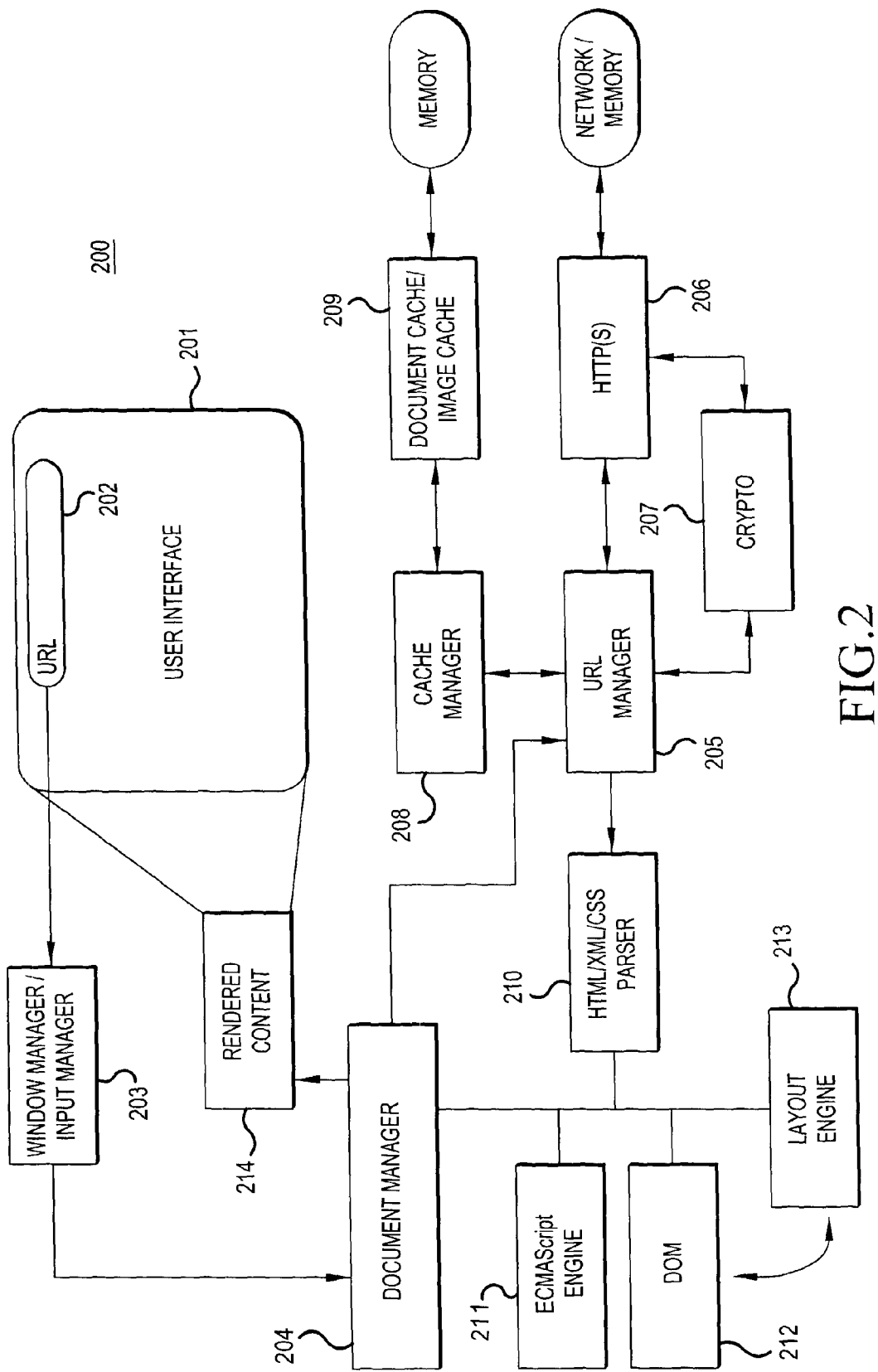
FIG. 2 depicts a number of modules that may be present in a user agent consistent with principles of the invention.

Various aspects of the present invention are consistent with implementation as components and/or functionality that make up parts of a user agent or a browser that may be installed as an application on a device 100. FIG. 2 shows an example of a number of modules that may be present in such a user agent. The modules will typically be software modules, or some other implementation in software, that may be executed by the CPU 101.

The user agent 200 presents the user with a user interface 201 that may be displayed on the display unit 120 shown in FIG. 1. The user interface may include an address field 202 where the user may use an input device to enter the URI of a document or a service he or she wants the user agent 200 to retrieve. The address field 202 may also be a link that is displayed and that may be activated by the user using a pointing device such as a mouse, a scrolling device or some other means for selecting displayed items. Alternatively the URI may be specified in the code of a document or script already loaded by the user agent.

In any case, the URI may be received by a window and input manager 203 that represents the input part of a user interface associated with or part of the user agent 200. The URI may then be forwarded to a document manager 204 which manages the data received as part of the document identified by the URI.

The document manager 204 forwards the URI to a URI manager 205 which again instructs a communication module 206 to request access to the identified resource. The communication module 206 may be capable of accessing and retrieving data from a remote device 130 such as a server over a network using the hypertext transfer protocol (HTTP) or some other protocol such as HTTPS or FTP. The communication module may also be capable of accessing data that is stored in local memory 102.

If communication outside the device 100 is required to be encrypted, e.g. as specified by the protocol used to access the URI, encryption/decryption module 207 handles communication between the URL manager 205 and the communication module 206.

The data received by the communication unit 206 in response to a request is forwarded to the URI manager 205. The URI manager may then store a copy of the received content in local memory 102 using a cache manager 208 which administers document and image cache 209. If the same URI is requested at a later time the URI manager 205 may request it from the cache manager 208 which, unless the cached copy has been deleted, will retrieve the data from the cache 209 and forward it to the URI manager 205. In this case it will not be necessary to retrieve the data again from a remote device 130 when the same URI is requested a second time.

The URI manager 205 forwards the received data to a parser 210 that may be capable of parsing such content as HTML, XML and CSS. The content may then, depending on the type and nature of the content, be processed further by an ECMAScript engine 211, a module for handling a document object model (DOM) structure 212 and/or a layout engine 213.

This processing of the retrieved content is administered by the document manager 204, which may also forward additional URI requests to the URI manager 205 as a result of the processing of the received content. These additional URIs may e.g. specify images or other additional files that should be embedded in the document specified by the original URI.

When the data representing the content of the specified document has been processed it is forwarded from the document manager 204 in order to be rendered by a rendering engine 214 and displayed on the user interface 201.

The various modules thus described are executed by the processing unit 101 as the processor receives instructions and data over the system bus(es) 106. The communications module 206 communicates with the remote device 130 using the network interface 105. The functionality of the various modules may of course be integrated in fewer larger modules, or distributed or replicated over several modules.

It will further be understood that the user agent 200 just described may be implemented as an application program 143, but that some functionality may also be part of the operating system 142 or even the BIOS 141 of the device 100. The content received in response to a URI request may be data 144, script 145 or a combination of these as further described below.

Figure 3:
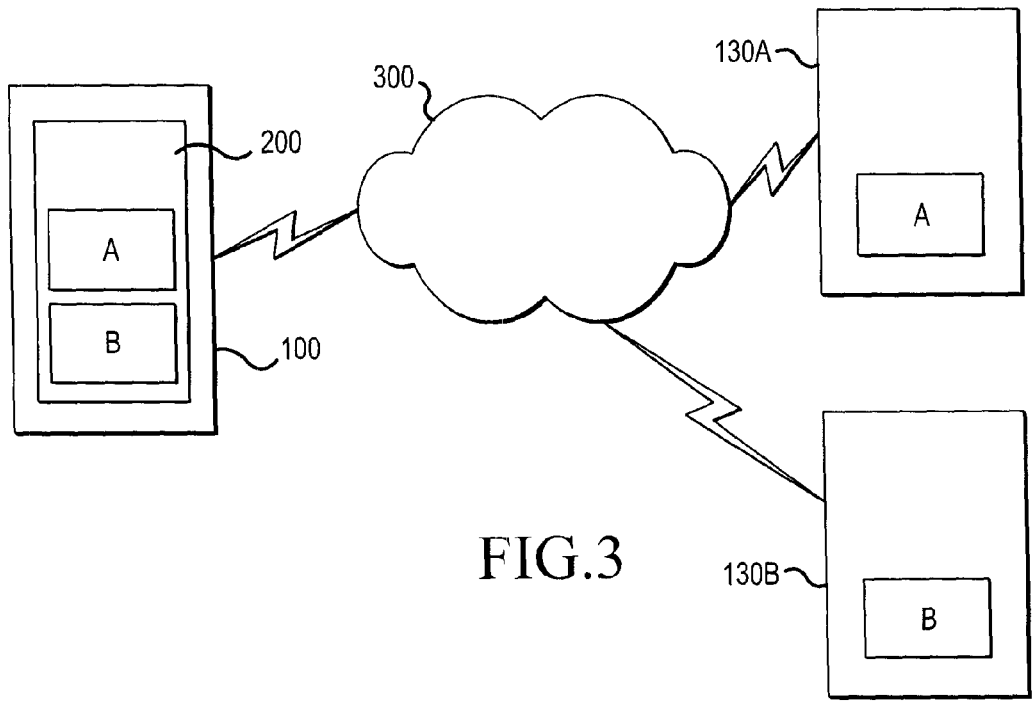
FIG. 3 shows a device connected to a network and operating in accordance with the invention.

FIG. 3 illustrates a device 100 running a user agent program 200, such as a browser. The user agent 200 has loaded a first document A, which again has caused a second document B to be similarly loaded, or which at least contains a reference to document B. Document B may have been specified through a Uniform Resource Identifier (URI) within object tags, iframe tags or through some other means inside document A. The URI for document A and B may be http://domain_a.com/a.html http://domain_b.com/b.html respectively.

The device 100 is connected to a communication network 300, such as the Internet, and the documents A and B may have been loaded from respective servers 130A and 130B that belong to different domains.

Assuming document B was loaded as a result of a URI specified in document A, the tags specifying document B cause the contents of B to be downloaded to the device 100. These tags create an association between document A and document B, and makes it possible to reference document B, or even elements that are part of document B, using DOM.

It may now be desirable to exchange messages between document A and document B. As an example, document A may contain dynamic objects that display information provided by document B. A dynamic object might be the display of a stock ticker or weather information downloaded from a server 130B by document B, or it might even be information about the local device 100 that is available to document B through some particular arrangement, but is not directly available to document A.

If B had been an original inline part of A, event communication would represent no problem. Since this is not the case, restrictions may apply in accordance with some security policy implemented by the DOM implementation and/or the ECMAScript engine.

If A and B contain scripts in an event-driven programming language such as ECMAScript, these scripts may register event handlers and event listeners on element nodes within the DOM trees, as long as they have a way of referencing each other. The ability to register such nodes on each other will depend on the origin of the documents A and B. According to the JavaScript security policy, implemented for most ECMAScript compatible languages, this will only be possible if the two documents A and B originate from the same domain, as described above.

According to one aspect of the present invention, a method is provided that allows documents to communicate with each other even if they originate from different domains, but in a way that is designed to not enable cross-site scripting attacks.

This capability may be introduced as extensions to the DOM interfaces provided by the user agent. One such interface will hereinbelow be referred to as the DocumentMessaging interface. This interface may declare a method that will be referred to as postMessage( ). According to one embodiment consistent with the principles of the invention, postMessage( ) is a method of the DOM document object.

The following is an exemplary declaration of the DocumentMessaging interface:

```
interface DocumentMessaging {
    void postMessage(in DOMString message);
};
```

A further interface provided as an aspect of the invention will be referred to as the CrossDocumentMessageEvent interface. This interface may have the attributes data, domain, uri and source.

A declaration of the CrossDocumentMessageEvent interface that is consistent with aspects of the present invention is shown below.

```
interface CrossDocumentMessageEvent: Event {
    readonly attribute DOMString data;
    readonly attribute DOMString domain;
    readonly attribute DOMString uri;
    readonly attribute Document source;
    void initCrossDocumentMessageEvent (
        in DOMString typeArg,
        in boolean canBubbleArg,
        in boolean cancelableArg,
        in DoMstring dataArg,
        in DOMString domainArg,
        in DoMString uriArg,
        in Document documentArg);
    void initCrossDocumentMessageEventNS (
        in DOMString namespaceURI,
        in DOMString typeArg,
        in boolean canBubbleArg,
        in boolean cancelableArg,
        in DOMString dataArg,
```

```
            -continued
   in DOMString domainArg, in DOMString uriArg, in Document documentArg);

};
```

Any Document object that supports messaging using aspects of the present invention may implement the DocumentMessaging interface. According to embodiments consistent with the principles of the invention, this may be done by declaring a Document class in the DOM module 212, which implements the interface, and which is instantiated as DOM document objects when a document is loaded and parsed.

Thus, when the two documents A and B are loaded into the device 100 by the user agent 200, they are first passed to the parser 210 which, under control of the document manager 204, parses the documents and creates a hierarchical DOM structure, including instantiation of DOM objects. Any script that is part of the documents will then be sent to the ECMAScript engine 211, and an environment for running the scripts will be created. This environment will include instantiations of any objects that are part of the created DOM structure, as they are defined in the ECMAScript engine 211 or the DOM module 212. This includes the necessary DOM document objects for document A and document B, and thereby their methods, including postMessage( ).

The CrossDocumentMessageEvent interface may be implemented in native code in the browser. According to one embodiment that is consistent with the principles of the invention, the necessary methods for creating the event and assigning the necessary values and attributes will typically be called from the implementation of postMessage( ) in native code in the user agent. This may include calling one of the methods initCrossDocumentMessageEvent( ) or initCrossDocumentMessageEventNS( ). These methods may initialize an event object in a manner that is similar to other initEvent( ) methods, and which are well known in the art. Typically, the created event bubbles, is cancelable, and has no default action.

In order to maintain security, the user agent 200 is configured to restrict when and how DOM objects may execute their methods, primarily by way of the same domain policy that has already been described. These restrictions may be implemented as a security manager in the DOM module 212 which may prevent methods from executing and/or raise an exception (i.e. simply return a specific error value) whenever a method is called in violation of the security policy. One aspect of the present invention involves excepting the postMessage( ) method from this security policy. That this is acceptable without unduly compromising the overall security of the user agent 200 will be explained below.

When a script attempts to send information to a different document, e.g. by using the postMessage( ) method declared by the DocumentMessaging interface, the user agent may be configured to create an event that uses the CrossDocumentMessageEvent interface. The data attribute may then be set to the value passed as the argument to the postMessage( ) method, the domain attribute may be set to the domain of the document that the script that invoked the method is associated with, the uri attribute may be set to the URI of that document, and the source attribute may be set to the object representing that document. The setting of these attributes is handled by the user agent in accordance with the protocols used to load the document containing the script and the definition of the CrossDocumentMessageEvent interface, and cannot be influenced by any script (with the exception of the suffix rule already described).

Continuing the example from FIG. 3, the document A may then contain the following XHTML code:

```
<div>
   <object data="http://domain_b.com/b.html" />
</div>
``` where http://domain_b.com/b.html is the URI of document B at server 130B. The object tag creates a reference from document A to document B.

The document A may further include the following script:

var o=document.getElementsByTagName('object') [0];

o.contentDocument.postMessage('Hello world');

This script retrieves the first object element in A such that the variable o is set to reference this element of document A, i.e. the object tag. o.contentDocument references the document identified by this element. In other words, o.contentDocument is a reference to document B. Finally, o.contentDocument.postMessage('Hello world') calls the method postMessage( ) on the referenced document B, and passes the string 'Hello world' as input to that method. postMessage( ) is a method of the DocumentMessaging interface as described above. It may be defined in the DOM module 212 as a method belonging to the document object, and hence be available to document A. The script then sends the message "Hello world" to document B as an event. This event, as defined by the CrossDocumentMessageEvent interface, includes the attributes data, containing the text string "Hello world", domain, which will include "domain_a.com", uri may contain "domain_a.com/a.html", and source, which will contain a reference to document A as object in the DOM environment. It should be noted that the words include and contain is intended to be understood in an unlimiting sense. Other attributes may also be included, and the attributes may contain more than what is specified above. As an example, the attribute uri may also include the protocol, e.g. "http://domain_a/a.html".

By using this method, security is maintained even if the documents do not originate from the same domain. First of all, document A is only able to reference documents it actually has knowledge of. Since document B is loaded through a reference in document A, document A has this ability because a reference to B exists as an object in document A's DOM tree. Document A has no way of accessing arbitrarily chosen documents present on the device 100. Second, since B is loaded by A, A knows that B is the intended recipient of the message. Since the loading of document B and its subsequent representation as a parsable object in the DOM environment all is handled by the user agent 200, the integrity of document B and its identity is maintained and cannot be forged by another document. Third, since the message contains the attributes described above, which again are assigned their values by the user agent and cannot be forged by any script in A, document B may implement checks to validate received event messages, as described below.

In order to register an event handler for incoming events the script in document B may use addEventListener( ), or some similar method. The script in document B may then include the following:

```
document.addEventListener ('message', receiver,
false);

function receiver(e) { if (e.domain == 'domain_a.com') { if (e.data == 'Hello world') { e.source.postMessage ('Hello');

} else { alert (e.data);

}

}

}
```

This script first defines an event listener within the context of the document itself, states the event listener should listen for a message, and that a function named receiver should handle that message. Since the event listener uses the CrossDocumentMessageEvent interface, as described above, the received message will include the attributes associated with this interface. If document B does not define any event listener at all, document A will not be able to send any message even if it is able to reference document B. Or more precisely, document B can only receive a message if its author has explicitly determined, by defining an event listener, that document B should listen for such a message. In the example above the function receiver( ) refers, locally, to any received message as "e".

Further security may be assured by having the script then checking if the domain associated with the document that invoked postMessage( ) on document B (i.e. document A) is the expected domain. In the example above the function receiver( ) checks that the domain attribute of the received message, e.domain, is the expected "domain_a.com". Only if this is the case is the actual contents of the message, the data attribute e.data, examined. Depending on the type of data the event listener expects, a further check may be implemented to make sure that the received message contains valid data. In the example above the receiver( ) function will only accept the string "Hello world". If the e.data attribute of the received message contains the expected string, the receiver( ) function invokes the postMessage( ) method and responds to by sending a message back to the document which sent the message in the first place. As explained above, the source attribute, e.source, of the received message refers to document A as an object in the DOM environment just like o.contentDocument referred to the corresponding document B object from within document A. The function call e.source.postMessage ('Hello') will then send and event message back to document A with "Hello" as the data attribute, and with the attributes domain, uri and source referencing B's originating domain, URI and document B as an object, respectively.

Figure 4:
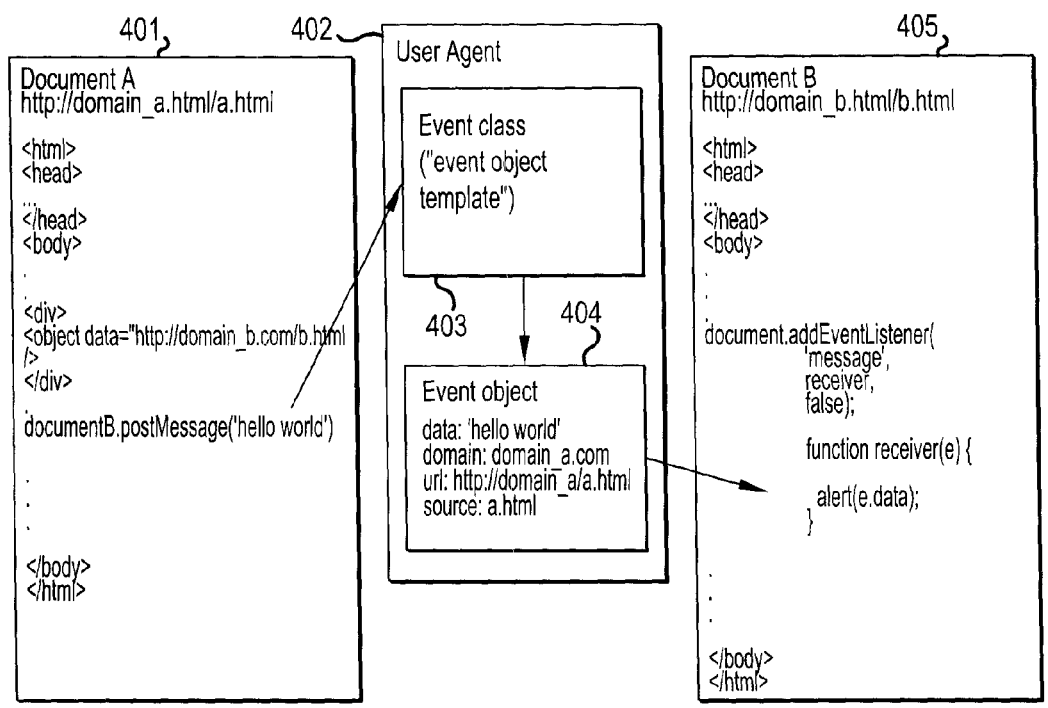
FIG. 4 illustrates how a message can be sent from a first to a second document in accordance with the invention.

FIG. 4 shows this process, but with slightly simplified code. In a firsts step 401, the postMessage( ) method is called on document B from document A. This call is handled by the user agent 402, which, using the CrossDocumentMessageEvent interface as described above, uses an "event template" 403 to instantiate an event object 404 and initialize it with appropriate attribute values. This event object, which exists in the script environment of document B, since it was called on document B from document A, is registered by an event listener named receiver( ) from a script running within document B 405.

Figure 5:
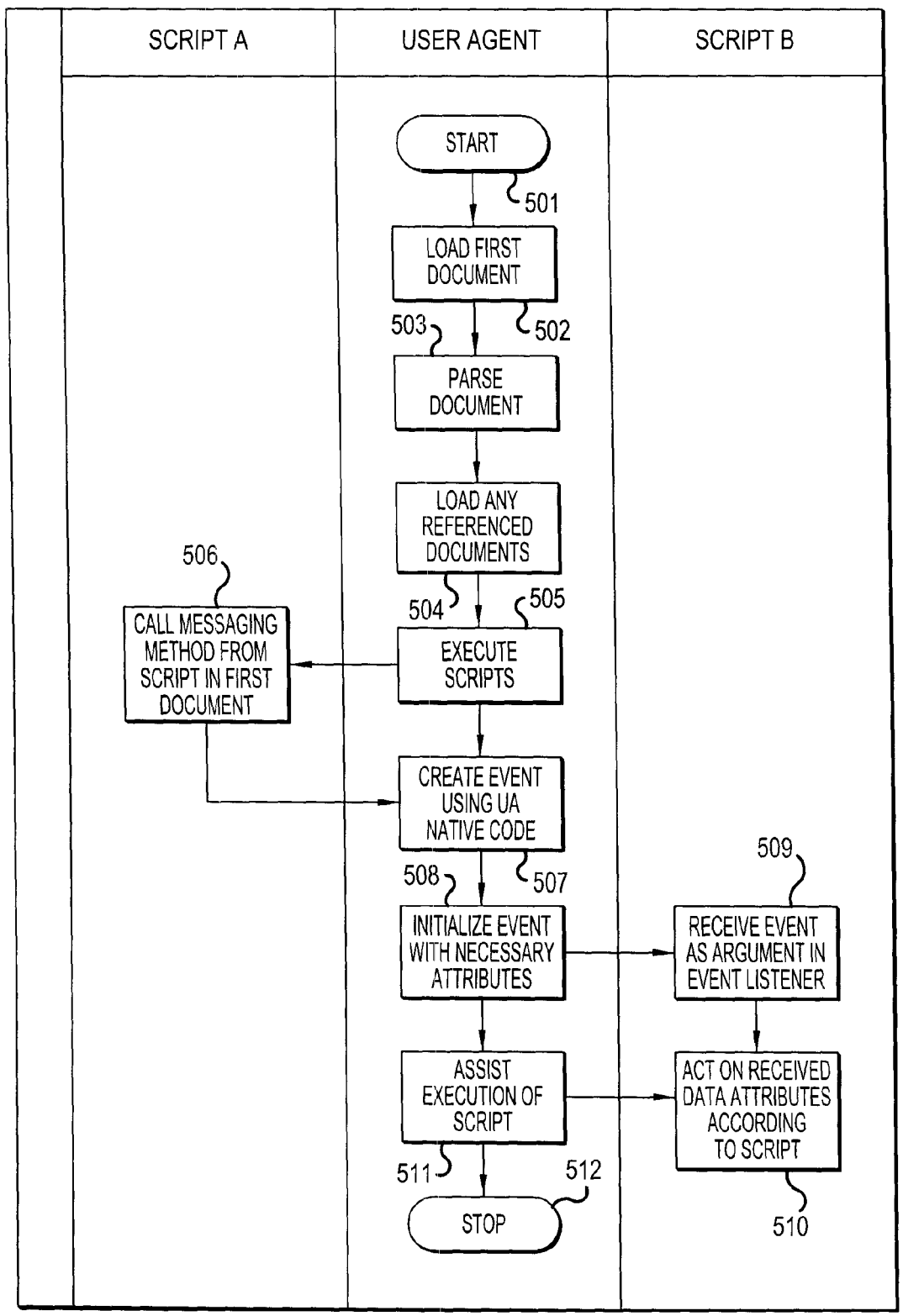
FIG. 5 shows a flowchart illustrating the process from a first document is loaded and until an event handler in a second document has received and acted upon a message event.

FIG. 5 shows a flowchart illustrating the process from a first document is loaded by a user agent 200 running on a device 100, and until an event handler in a second document has received a message event and acted accordingly.

A first step 501 signifies the start of the process. In a second step 502 a first document A is loaded by the user agent 200. In a third step 503, the document is parsed in a manner described above, and any documents or other resources referenced in the document and required to be loaded is fetched and loaded by the user agent 100 in a next step 504. Any script in the document is then executed 505, and control is then transferred to the script 506. Strictly speaking, the script is of course not running independently from the user agent. The execution of the script is performed by the ECMAscript module of the user agent and is ultimately executed in native code, but as long as the script does not contain errors, it is controlling the execution.

If the script includes an attempt at sending a message to a second document B, in accordance with the invention, e.g. by calling a postsMessage( ) method on document B, control is returned to the user agent in step 507. The user agent receives creates an event object based on an event class, e.g. using the implementation of a CrossDocumentMessageEvent interface in native code. The event object is initialized 508 with the proper attributes, including data which contains the text string received as argument by the postMessage( ) method and domain which contains the domain of the document calling the postMessage( ) method, i.e. document A. As described above, the attributes may also include uri which uniquely identifies document A globally, and source which identifies document A locally.

After the event object has been created and properly initialized, it is passed to the second document, which may simply mean that it becomes an object in the script environment of the second document. For the second document to be able to receive and utilize the information contained in the message event, it may contain a script that runs within the context of the second document, and which includes a properly declared event listener. The event listener receives the event as an argument in a step 509, and acts on the received data according to the instructions contained in the script.

Like the script in the first document, the script in the second document will at least be assisted by the ECMAscript module of the user agent, and it may contain instructions that return control to the user agent 511. The further progress of the execution of scripts, additional exchange of message events, display of information and so on, depends on what additional code may exist in the first and second documents and any additional document also loaded by the user agent. In the example illustrated in FIG. 5 the process comes to a halt in a final step 512.

Since the domain attribute is set by the user agent when the postMessage( ) method is invoked, it cannot be manipulated by the script from the source domain. The only exception to this rule is the change of document.domain to a suffix of the original domain, as described above. When the documents A and B are downloaded from their respective servers 130A, 130B, the user agent knows the domains from which they are downloaded. In order for a script on one server to maliciously attack a document downloaded from a different server, the attacker would have to take control of the server itself, or hijack the domain of that server.

As an example, if document B contains a script that accepts event messages from documents originating from domain_a-

.com, a script attacking document B would have to be downloaded by the user agent from that domain. In other words, the attacker would either have to be able to make the malicious code available for download from the server 130A with that domain, or she would have to make her own server 130C present itself as the server with that domain name, which would have to involve rather sophisticated attacks on the addressing of domains on the Internet itself. This type of attack means actually taking control of a server, and is not something that can be handled on the client side.

The invention has been described by way of an example where the method postMessage( ) is a method belonging to the DOM document object. As will readily be understood by the skilled person, other alternatives are possible. One alternative would be to declare postMessage( ) as a method of the DOM window object. It will be seen that calling the method window.postMessage( ) does not identify the recipient document, which in this case would have to be identified as an argument of the function. One possibility of doing this would be to use the object reference, in the example above that would be o.contentDocument, as the argument. However, it would also be possible to use the URI of the receiving document as argument, and in this case the method call would also cause the document to be loaded if it was not already loaded by the user agent 200. In this case the script in document A in the above example would be changed simply to window.postMessage('http://domain_b.com/b.html', 'Hello world');

The script in document B may then be as follows:

```
document.addEventListener ('message', receiver,
false);

function receiver(e) {
    if (e.domain == 'domain_a.com') {
        if (e.data == 'Hello world') {
            window.postMessage(e.uri, 'Hello');
        } else {
            alert(e.data);
        }
    }
}
```

It should also be understood that the script parts of documents A and B in the above examples are exemplary only. Exactly what kind of data the author of a document wants to send to a receiving document is virtually unlimited. Similarly, there are no limits to how the received data can be processed by the script in the receiving document. The data may be displayed, initiate the execution of another script or program, result in a response being sent back to the first document, or anything else, only limited by the imagination of the author, and of course by security policies and restrictions.

Finally, while the invention has been described in terms of an object oriented paradigm using the DOM model to relate the various parts of the documents to each other. It will be understood by those skilled in the art that the invention may also be implemented using a different programming paradigm, such as procedural programming, as long as the user agent includes a script engine that allows execution of scripts contained in loaded documents, and implements protocols that enable the user agent to instantiate events with the proper attributes without any influence from the scripts regarding the attributes that define the origin of the document.

Similarly, in the above examples the interfaces used by the methods have been given explicit names and are defined separately. However, it is possible to implement the invention without explicit interface names, so long as there exists a well defined way of calling the proper functions or methods from a script, and to initiate events in accordance with the invention.

The invention claimed is:

1. A method for sending data from a first to a second document loaded by a user agent implemented on a client device having one or more computer processors, the method comprising:
utilizing the one or more computer processors in the client device to:
transmit first and second download requests for the first and second documents, respectively, the first and second download requests identifying different domains as respective origins from which the first and second documents are to be loaded;
execute a script in said first document which has been loaded by the user agent in response to the first download request, said script providing data to be sent to said second document;
retrieve, from information collected by the user agent when the first document was loaded in response to the first download request, identification information uniquely identifying said first document and said origin of said first document; and
send a message including said data and said identification information to said second document which has been loaded by the user agent in response to the second download request,
wherein said script in said first document invokes a method implemented in said user agent, said method being defined to receive the data to be exchanged, receive information identifying said second document, extract information identifying said origin of said first document, and pass said data to be exchanged and said extracted information identifying said origin of said first document to said second document, and
wherein said first and second documents and the structure of said first and second documents are addressed according to application programming interfaces (APIs) defined in a Document Object Model (DOM) module that is part of said user agent, and said method further comprises:
instantiating, upon loading said first and said second document, two objects representing said first and second documents.

2. The method according to claim 1, further comprising utilizing the one or more computer processors to execute a script in said second document in order to:
cause an event listener defined in said second document to receive said sent message; and
process said data according to the script in said second document.

3. The method according to claim 1, wherein said identification information includes information representing the domain from which said first document has been retrieved.

4. The method according to claim 1, wherein said identification information includes information representing a URI for said first document.

5. The method according to claim 1, wherein said information identifying said second document is a reference to a DOM document object representing said second document, and said method is called as a method belonging to said second document or said representation of said second document.

6. The method according to claim 1, wherein said identification information includes a reference to a DOM object representing a local instantiation of said first document.

7. The method according to claim 1, wherein said method belongs to a DOM document type object.

8. The method according to claim 1, wherein said first and second documents and the structure of said first and second documents are addressed according to application programming interfaces (APIs) defined in a Document Object Model (DOM) module that is part of said user agent, and said method belongs to a DOM window type object.

9. The method according to claim 1, wherein said script is ECMAScript or substantially ECMAScript compatible.

10. A computer program embodied on a computer readable storage device, the program containing a set of instructions, which are executed by one or more computer processors in order to perform the method in claim 1.

11. The computer program product according to claim 10, wherein the computer readable storage device comprises one of the following: a magnetic storage device, an optical storage device, and a flash memory.

12. A computer device with a display configured to load and display documents, and comprising one or more computer processors which execute computer program code to perform:
transmitting first and second download requests for first and second documents respectively, the first and second download requests identifying different domains as respective origins from which the first and second documents are to be loaded;
executing a script in said first document which has been loaded by a user agent implemented on the computer device in response to the first download request, said script providing data to be sent to said second document;
retrieving, from information collected by the user agent when the first document was loaded in response to the first download request, identification information uniquely identifying said first document and an-said origin of said first document; and
sending a message including said data and said identification information to said second document which has been loaded by the user agent in response to the second download request,
wherein said script in said first document invokes a method implemented in said user agent, said method being defined to receive the data to be exchanged, receive information identifying said second document, extract said information identifying said origin of said first document, and pass said information to be exchanged and said information identifying origin of said first document to said second document, and
wherein said first and second documents and the structure of said first and second documents are addressed according to application programming interfaces (APIs), defined in a Document Object Model (DOM) module that is part of said user agent, and the computer device is further configured to perform:
instantiating, upon loading said first and said second document, two objects representing said first and second documents.

13. The computer device according to claim 12, wherein the one or more computer programs further execute a script in the second document in order to perform the steps of:
causing an event listener defined in said second document to receive said sent message; and
processing said data according to the script in said second document.

14. The computer device according to claim 12, wherein said identification information includes information representing the domain from which said first document has been retrieved.

15. The computer device according to claim 12, wherein said identification information includes information representing a URI for said first document.

16. The computer device according to claim 12, wherein said information identifying said second document is a reference to a DOM document object representing said second document, and said method is called as a method belonging to said second document or said representation of said second document.

17. The computer device according to claim 12, wherein said identification information includes a reference to a DOM object representing a local instantiation of said first document.

18. The computer device according to claim 12, wherein said method belongs to a DOM document type object.

19. The computer device according to claim 12, wherein said first and second documents and the structure of said first and second documents are addressed according to application programming interfaces (APIs) defined in a Document Object Model (DOM) module that is part of said user agent, and said method belongs to a DOM window type object.

20. The computer device according to claim 12, wherein said script is ECMAScript or substantially ECMAScript compatible.

* * * * *